United States Patent
Bak et al.

(10) Patent No.: US 10,912,322 B2
(45) Date of Patent: Feb. 9, 2021

(54) ALLULOSE-CONTAINING SYRUP COMPOSITION AND FOOD CONTAINING SAME

(71) Applicant: CJ CHEILJEDANG CORPORATION, Seoul (KR)

(72) Inventors: Youn Kyung Bak, Suwon (KR); Jung Gyu Park, Incheon (KR); Sung Bae Byun, Sejong (KR); Jong Min Choi, Suwon (KR); Seung Won Park, Yongin (KR); Dong Chul Jung, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 145 days.

(21) Appl. No.: 16/074,410

(22) PCT Filed: Mar. 6, 2017

(86) PCT No.: PCT/KR2017/002405
§ 371 (c)(1),
(2) Date: Jul. 31, 2018

(87) PCT Pub. No.: WO2017/155261
PCT Pub. Date: Sep. 14, 2017

(65) Prior Publication Data
US 2019/0029299 A1   Jan. 31, 2019

(30) Foreign Application Priority Data

Mar. 9, 2016 (KR) .................. 10-2016-0028520

(51) Int. Cl.
*A23L 27/30* (2016.01)
*A23L 29/30* (2016.01)
(Continued)

(52) U.S. Cl.
CPC .............. *A23L 27/34* (2016.08); *A23L 27/12* (2016.08); *A23L 27/40* (2016.08); *A23L 27/88* (2016.08);
(Continued)

(58) Field of Classification Search
CPC ........... A23L 27/33; A23L 29/30; A23L 2/60; A23L 33/125; A23L 33/15; A23L 27/30;
(Continued)

(56) References Cited

U.S. PATENT DOCUMENTS 5,306,519 A     4/1994   Peterson et al.
5,478,589 A *  12/1995   Jones .................... A23L 29/256
                                                               426/573
(Continued)

FOREIGN PATENT DOCUMENTS

GB        2526383 A       11/2015
JP      H02145158 A        6/1990
(Continued)

OTHER PUBLICATIONS

Search Report dated Oct. 25, 2019 for European Application No. 17763522.4.
(Continued)

*Primary Examiner* — Jenna A Watts

(57) ABSTRACT

Disclosed herein are a syrup composition and a food comprising the same. The syrup composition includes: gum, pectin, or a combination thereof; and allulose.

11 Claims, 1 Drawing Sheet

(51) Int. Cl.
*A23L 27/12* (2016.01)
*A23L 33/20* (2016.01)
*A23L 27/40* (2016.01)
*A23L 27/00* (2016.01)
*A23L 29/269* (2016.01)
*A23L 29/262* (2016.01)
*A23L 29/231* (2016.01)
*A23L 29/256* (2016.01)

(52) U.S. Cl.
CPC ........... *A23L 29/231* (2016.08); *A23L 29/256* (2016.08); *A23L 29/262* (2016.08); *A23L 29/27* (2016.08); *A23L 29/30* (2016.08); *A23L 33/20* (2016.08); *A23V 2002/00* (2013.01); *A23V 2200/16* (2013.01); *A23V 2200/244* (2013.01); *A23V 2250/5036* (2013.01); *A23V 2250/5072* (2013.01); *A23V 2250/5086* (2013.01); *A23V 2250/5108* (2013.01); *A23V 2250/60* (2013.01)

(58) Field of Classification Search
CPC ............ A23V 2002/00; A23V 2200/02; A23V 2200/212; A23V 2250/60; C13K 13/00; G09G 2300/0413; G09G 2300/0443; G09G 2310/0232; G09G 2310/027; G09G 2320/0242; G09G 2320/0271; G09G 3/2003; G09G 3/2074
See application file for complete search history.

(56) References Cited

U.S. PATENT DOCUMENTS

| | | | |
|---|---|---|---|
| 5,631,034 A | 5/1997 | Trumbetas et al. | |
| 8,383,183 B2 | 2/2013 | Prakash et al. | |
| 2008/0292765 A1 | 11/2008 | Prakash et al. | |
| 2010/0003370 A1 | 1/2010 | De Baets | |
| 2010/0204346 A1 | 8/2010 | Okuma et al. | |
| 2011/0318464 A1 | 12/2011 | Prakash et al. | |
| 2014/0342044 A1 | 11/2014 | Bell et al. | |
| 2016/0302463 A1* | 10/2016 | Woodyer | A23L 33/125 |
| 2017/0079313 A1 | 3/2017 | Woodyer et al. | |
| 2018/0049458 A1* | 2/2018 | Woodyer | A23L 33/125 |

FOREIGN PATENT DOCUMENTS

| | | |
|---|---|---|
| JP | H0746965 A | 2/1995 |
| JP | 2002345410 A | 12/2002 |
| JP | 2006141226 A | 6/2006 |
| JP | 2006149211 A | 6/2006 |
| JP | 2010527611 A | 8/2010 |
| JP | 2011-521628 A | 7/2011 |
| JP | 2013247872 A | 12/2013 |
| JP | 2014027926 A | 2/2014 |
| JP | 2014155466 A | 8/2014 |
| KR | 10-2002-0034209 A | 5/2002 |
| KR | 10-2015-0130323 A | 11/2015 |
| WO | 0069275 A1 | 11/2000 |
| WO | 2015/075473 A1 | 5/2015 |
| WO | 2015075473 A1 | 5/2015 |
| WO | 2015177522 A1 | 11/2015 |
| WO | 2016/135458 A1 | 9/2016 |

OTHER PUBLICATIONS

International Search Report for PCT/KR2017/002405 filed on Mar. 6, 2017.

* cited by examiner

ALLULOSE-CONTAINING SYRUP COMPOSITION AND FOOD CONTAINING SAME

CROSS-REFERENCE TO RELATED APPLICATIONS

The present specification is a U.S. National Stage of International Patent Application No. PCT/KR2017/002405 filed Mar. 6, 2017, which claims priority to and the benefit of Korean Patent Application No. 10-2016-0028520 filed in the Korean Intellectual Property Office on Mar. 9, 2016, the entire contents of which are incorporated herein by reference.

TECHNICAL FIELD

The present invention relates to an allulose-containing syrup composition and a food comprising the same.

BACKGROUND ART

Sugar is the first natural sweetener discovered by mankind and is used as the most suitable material for sweetness. Sugar is a direct source of energy to humans, has excellent sweetness, and is thus used in various fields. However, since sugar readily crystallizes, there is a problem in that food hardens after a certain period of time after adding sugar to the food. In addition, studies have shown that excessive intake of sugar can cause adult diseases such as obesity and diabetes due to high calorie content (about 400 kcal/100 g). In recent years, there has been demand for a sweetener substitute for sugar as WHO limits total sugar intake to less than 10% of total calories.

Thus, liquid sugars (for example, starch syrup, invert sugar syrup, high fructose corn syrup, and oligosaccharides), which are well soluble in food, have low crystallinity (i.e., high storage stability), and have a certain viscosity to preserve the moisture and taste of food and to provide cooking convenience and gloss, are widely used as substitutes for sugar. However, starch syrup (about 310 kcal/100 g) and invert sugar syrup (about 310 kcal/100 g) among liquid sugars have little calorie reduction effect, and oligosaccharides with low calorie content (about 250 kcal/100 g) have a low sugar content, resulting in consumption of calories similar to sugar when a large amount of oligosaccharides is used to produce the same sweetness as sugar.

Recently, allulose, which has a sweetness of about 70% that of sugar and almost zero calories, is attracting much attention as a substitute for sugar. However, since allulose has low viscosity and high flowability, it is difficult to adjust the addition amount of allulose. In addition, allulose is not well mixed with other foods during cooking and thus has poor usability and cooking suitability. When the heating time is increased to increase the viscosity of allulose, a food to which allulose is added can be discolored due to caramelization caused by excessive heating and can taste burnt, thereby causing deterioration in palatability. Further, allulose leaves bitter and astringent aftertastes, thereby causing deterioration in flavor and has poor storage stability due to high crystallinity over time. Thus, allulose is not suitable for use as a liquid sugar to replace sugar.

The present inventors have found that, when gum or pectin is added to allulose, the allulose can have properties (for example, viscosity and gloss) similar to typical commercially available liquid sugars, thereby having improved usability and cooking suitability; can have a low degree of crystallization, thereby having increased storage stability; and can have reduced off-taste and off-flavor and improved preference, thereby exhibiting improved palatability, and thus completed the present invention.

RELATED LITERATURE

Patent Document

International Patent Application Publication No. WO2015/075473

DISCLOSURE

Technical Problem

It is an aspect of the present invention to provide a syrup composition including allulose.

It is another aspect of the present application to provide a food comprising the syrup composition according to the present application.

Hereinafter, embodiments of the present invention will be described in detail. In addition, descriptions of details apparent to those skilled in the art will be omitted for clarity.

Technical Solution

In accordance with one aspect of the present invention, there is provided a syrup composition including: gum, pectin or a combination thereof; and allulose.

Specifically, the syrup composition according to the present application may have a viscosity of 600 cP to 7,000 cP, more specifically, 660 cP to 6,800 cP, 880 cP to 3,300 cP, 780 cP to 3,360 cP, 840 cP to 3,280 cP, or 720 cP to 6,460 cP. If the viscosity of the syrup composition is less than 600 cP or exceeds 7,000 cP, cooking convenience and palatability of the syrup composition can be deteriorated. That is, if the viscosity of the syrup composition is less than 600 cP, the syrup composition has too low stickiness, causing reduction in cooking convenience (that is, causing difficulty in adjusting the addition amount of the syrup composition), and it is difficult to preserve the moisture and taste of a food, causing deterioration in palatability. If the viscosity of the syrup composition exceeds 7,000 cP, the syrup composition has excessively high stickiness, causing reduction in cooking convenience and has low gloss, thereby causing deterioration in palatability. As demonstrated in the following examples, the syrup composition according to the present invention includes liquid allulose, the viscosity of which is increased from about 200 cP to the viscosity level of typical liquid sugar without caramelization, thereby improving usability and cooking suitability while maintaining gloss to prevent deterioration in palatability.

As used herein, the term "allulose" refers to a C-3 epimer of fructose, which is a kind of ketohexose, a natural saccharide present in trace amounts in nature.

The allulose according to the present invention may be solid or liquid allulose, specifically liquid allulose.

In addition, the allulose may be present in an amount of 5 parts by weight to 99 parts by weight, 10 parts by weight to 99 parts by weight, 30 parts by weight to 99 parts by weight, 50 parts by weight to 99 parts by weight, 70 parts by weight to 99 parts by weight, 90 parts by weight to 99 parts by weight, 93 parts by weight to 99 parts by weight, 5 parts by weight to 97 parts by weight, 10 parts by weight to 97 parts by weight, 30 parts by weight to 97 parts by weight, 50 parts by weight to 97 parts by weight, 70 parts by weight to 97 parts by weight, 90 parts by weight to 97 parts by weight, 93 parts by weight to 97 parts by weight, 5 parts by weight to 95 parts by weight, 10 parts by weight to 95 parts by weight, 30 parts by weight to 95 parts by weight, 50 parts by weight to 95 parts by weight, 70 parts by weight to 95 parts by weight, 90 parts by weight to 95 parts by weight, 93 parts by weight to 95 parts by weight, or 95 parts by weight relative to 100 parts by weight of the syrup composition in terms of solid content.

As used herein, the term "gum" refers to a water-soluble polysaccharide. Examples of the gum may include arabic gum, cellulose gum, tragacanth gum, locust bean gum, karaya gum, ghatti gum, tara gum, konjac gum, xanthan gum, curdlan gum, gellan gum, algin gum, and carrageenan gum, without being limited thereto. Specifically, the gum may be cellulose gum, carrageenan gum or xanthan gum.

As used herein, the term "pectin" refers to a colloidal polysaccharide composed of alpha-1,4-linkages of D-galacturonic acid units. Examples of the pectin may include low methoxyl (LM) pectin (degree of esterification (DE)<50%), high methoxyl (HM) pectin (DE>50%), and amide pectin, without being limited thereto.

In the syrup composition, the gum, the pectin, or a combination thereof may be present in an amount of 0.05 parts by weight to 1 part by weight, specifically 0.05 parts by weight to 0.5 parts by weight, 0.05 parts by weight to 0.3 parts by weight, 0.05 parts by weight to 0.2 parts by weight, 0.1 parts by weight to 0.5 parts by weight, 0.1 parts by weight to 0.3 parts by weight, 0.1 parts by weight to 0.2 parts by weight, 0.2 parts by weight to 0.5 parts by weight, 0.2 parts by weight to 0.3 parts by weight, or 0.2 parts by weight relative to 100 parts by weight of the allulose in terms of solid content. For example, the pectin may be present in an amount of 0.05 parts by weight to 1 part by weight, 0.05 parts by weight to 0.5 parts by weight, 0.05 parts by weight to 0.3 parts by weight, 0.05 parts by weight to 0.2 parts by weight, specifically 0.1 parts by weight to 0.5 parts by weight relative to 100 parts by weight of the allulose in terms of solid content.

The gum or the pectin may be in powder, crystalline, or liquid form, without being limited thereto.

In addition to the gum, the pectin or a combination thereof, and the allulose, the syrup composition according to the present invention may further include a salt. The salt may include sodium chloride, potassium chloride, magnesium chloride, calcium chloride, sodium glutamate, and sodium succinate, without being limited thereto. Specifically, the salt may include bay salts, reproduced salts, burnt salts, molten salts, refined salts, and processed salts, without being limited thereto.

The salt may be present in an amount of 0.05 parts by weight to 5 parts by weight, specifically 0.05 parts by weight to 3 parts by weight, 0.05 parts by weight to 2 parts by weight, 0.05 parts by weight to 1 part by weight, 0.05 parts by weight to 0.7 parts by weight, 0.05 parts by weight to 0.5 parts by weight, 0.1 parts by weight to 5 parts by weight, 0.1 parts by weight to 3 parts by weight, 0.1 parts by weight to 2 parts by weight, 0.1 parts by weight to 1 part by weight, 0.1 parts by weight to 0.7 parts by weight, 0.3 parts by weight to 5 parts by weight, 0.3 parts by weight to 3 parts by weight, 0.3 parts by weight to 2 parts by weight, 0.3 parts by weight to 1 part by weight, 0.3 parts by weight to 0.7 parts by weight, 0.5 parts by weight to 5 parts by weight, 0.5 parts by weight to 3 parts by weight, 0.5 parts by weight to 2 parts by weight, 0.5 parts by weight to 1 part by weight, 0.5 parts by weight to 0.7 parts by weight, or 0.5 parts by weight relative to 100 parts by weight of the allulose in terms of solid content.

The syrup composition according to the present invention may further include a sweetening agent, a synthetic preservative, a natural preservative, an acidity regulator or a combination thereof. Examples of the sweetening agent may include glucose, fructose, lactose, maltose, sugar, sugar, sugar syrup, sugar alcohols, oligosaccharides, tagatose, xylose, honey, high sweetening agents (for example, steviol glycoside, sucralose, aspartame, acesulfame potassium, saccharin sodium, a siraitia grosvenorii extract, tomatine, a citrus extract, cyclamate, neotame, glycyrrhizin (licorice), alitame, and phyllodulcin), dietary fiber, and dextrin, without being limited thereto. Examples of the synthetic preservative may include potassium sorbate, calcium sorbate, sorbic acid, sodium benzoate, benzoic acid, potassium benzoate, calcium benzoate, methyl p-hydroxybenzoate, and ethyl p-hydroxybenzoate, without being limited thereto. Examples of the natural preservative may include grapefruit seed extract, citrus extract, complex *Scutellaria baicalensis* extract, lactic acid bacterium complex powder, and polylysine, without being limited thereto. Examples of the acidity regulator may include citric acid, malic acid, sodium citrate, sodium carbonate, sodium hydrogen carbonate, sodium tertiary phosphate, potassium carbonate, and tribasic potassium phosphate, without being limited thereto.

In accordance with another aspect of the present invention, there is provided a method of preparing a syrup composition which includes applying gum, pectin, or a combination thereof to allulose.

As used herein, the term "applying" includes mixing, adding, coating and spraying, without being limited thereto. Specifically, the applying may be mixing or adding.

The method of preparing a syrup composition according to the present invention may further include applying a salt to the allulose. Here, application of the salt to the allulose may be performed before, after, or simultaneously with applying the gum, the pectin or a combination thereof to the allulose.

Since the allulose, the gum, the pectin, the salt, the viscosity and the like have been described in descriptions of the syrup composition, detailed description thereof will be omitted.

In accordance with a further aspect of the present invention, there is provided a method for improving at least one property selected from the group consisting of viscosity, taste, and storage stability of a syrup composition, which includes applying gum, pectin, or a combination thereof to allulose. Specifically, in accordance with a method of improving viscosity of a syrup composition of the present invention, the viscosity of the syrup composition can range from 600 cP to 7,000 cP. In addition, in accordance with a method of improving taste of a syrup composition of the present invention, off-taste and/or off-flavor of the syrup composition can be masked. Further, in accordance with a method of improving storage stability of a syrup composition of the present invention, crystallization can be suppressed.

The method for improving the properties of a syrup composition may further include applying a salt to the allulose. Here, application of the salt to the allulose may be performed before, after, or simultaneously with applying the gum, the pectin or a combination thereof to the allulose.

Since the allulose, the gum, the pectin, the salt, the viscosity, application of the gum, the pectin, or a combination thereof, and application of the salt have been described in the above aspects of the present invention, detailed description thereof will be omitted.

In accordance with yet another aspect of the present invention, there is provided a food comprising the syrup composition according to the present invention. The food according to the present invention may include general foods, health foods, and medicinal (or patient) foods, without being limited thereto.

When the syrup composition according to the present invention is used in food, the syrup composition may be added alone or in combination with other foods or food ingredients and may be suitably used according to a typical method. The amount of active ingredients to be mixed may be suitably determined according to the intended use (prevention, health or therapeutic treatment).

Examples of the food according to the present invention may include meat, sausage, bread, cake, chocolate, candy, snacks, confectionery (such as cookies and crackers), pizza, noodles (e.g., ramen etc.), gum, dairy products including ice cream, various soups, ketchup, sauces, gravies, dressings, beverages, tea, drinks, alcoholic beverages and vitamin complexes.

The food may contain various flavoring agents or natural carbohydrates as an additional ingredient. Examples of the natural carbohydrates may include monosaccharides such as glucose and fructose, disaccharides such as maltose and sucrose, polysaccharides such as dextrin and cyclodextrin, and sugar alcohols such as xylitol, sorbitol and erythritol. Examples of the flavoring agents may include natural flavors such as thaumatin and *stevia* extract and synthetic flavoring agents such as saccharin and aspartame. The natural carbohydrates may be present in an amount of about 0.01 g to 0.20 g, specifically about 0.04 g to 0.10 g per 100 ml of the food according to the present application.

In addition, the food may further contain various nutrients, vitamins, electrolytes, flavors, colorants, pectic acid and a salt thereof, alginic acid and a salt thereof, organic acids, protective colloid thickeners, pH adjusters, stabilizers, preservatives, glycerin, alcohols, carbonating agents used in carbonated drinks, and the like. In addition to these, the food according to the present invention may contain fruit flesh for natural fruit juices, fruit juice drinks and vegetable drinks. These ingredients may be may be used alone or in combination thereof. These additional ingredients may be present in an amount of 0.01 parts by weight to 0.20 parts by weight relative to 100 parts by weight of the food according to the present invention.

Advantageous Effects

The present invention provides an allulose-containing syrup composition including gum, pectin, or a combination thereof, which can maintain gloss and improve low storage stability and low viscosity of allulose, thereby increasing cooking convenience while effectively masking off-taste and/or off-flavor of the allulose to improve palatability. The syrup composition according to the present invention can be applied to various foods in place of sugar and typical liquid sugar.

MODE FOR INVENTION

Figure 1:
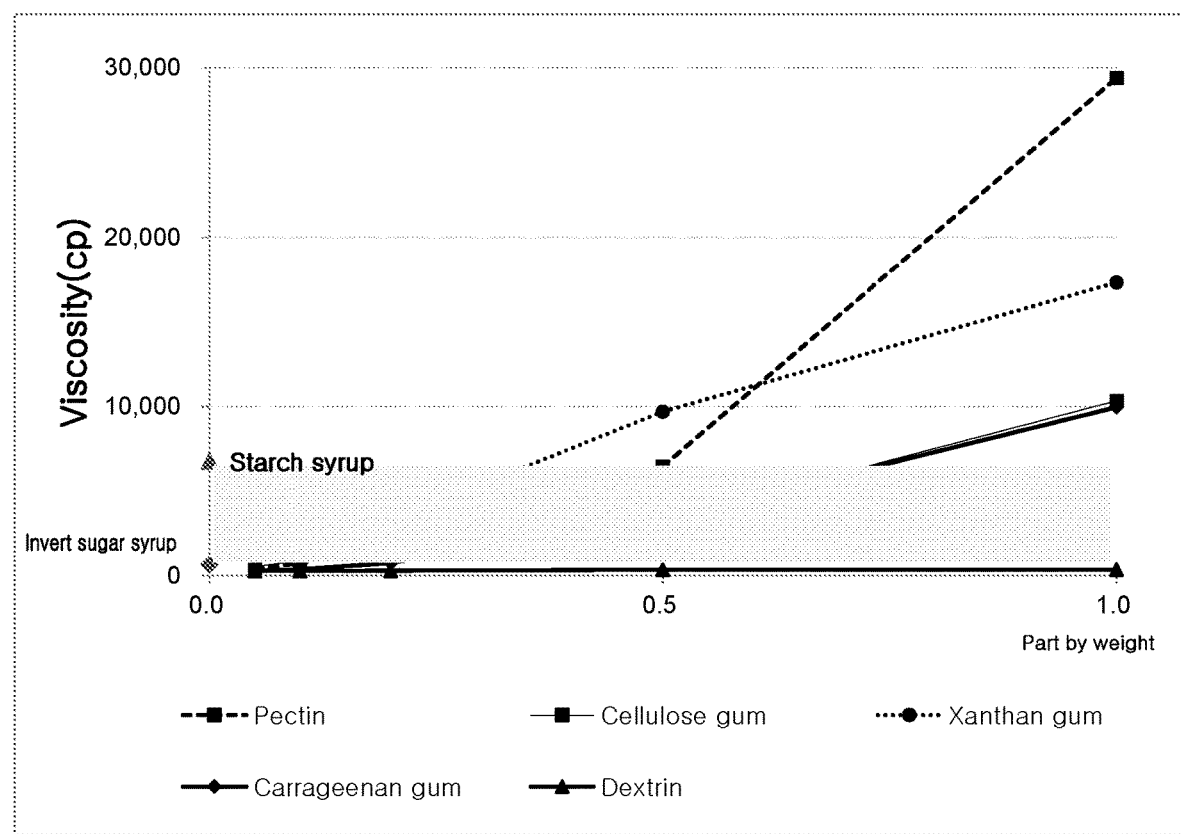
FIG. 1 is a graph showing viscosity of the compositions according to several Examples of the present invention.

Hereinafter, the present invention will be described in more detail with reference to examples. However, it should be understood that these examples are provided for illustration only and are not to be construed in any way as limiting the present invention.

Examples 1 to 25: Preparation of Allulose-Containing Syrup Composition

Relative to 100 parts by weight of liquid allulose (solid content: 70 wt % to 76 wt %, 95 parts by weight of allulose and 5 parts by weight of fructose relative to 100 parts by weight of the liquid allulose in terms of solid content, CJ CheilJedang) in terms of solid content, cellulose gum (Walocel 100PA, DYNESOZE Co., Ltd.), carrageenan gum (Satiagel ABN 26, SKT TRADING), xanthan gum (DYNESOZE Co., Ltd.), pectin (GENU Explorer pectin 65CS, JUPITER INTERNATIONAL Co., Ltd.), or dextrin (CJ CheilJedang) were mixed in an amount of 0.05 parts by weight, 0.10 parts by weight, 0.20 parts by weight, 0.50 parts by weight, or 1.00 part by weight, followed by homogenization, thereby preparing a syrup composition.

Comparative Example: Commercially Available Liquid Sugar

Commercially available liquid sugars, which are generally used in place of sugar in the art, were used as Comparative Examples.

Comparative Example 1: Allulose

Liquid allulose (solid content: 70 wt % to 76 wt %, 95 parts by weight of allulose and 5 parts by weight of fructose relative to 100 parts by weight of the liquid allulose in terms of solid content, CJ CheilJedang) was used in an amount of 100 wt %.

Comparative Example 2: Invert Sugar Syrup

Commercially available invert sugar syrup (Beksul cooking syrup (raw sugar), oligosaccharide, CJ CheilJedang) was used in an amount of 100 wt %.

Comparative Example 3: Oligosaccharide

Commercially available dietary fiber-containing oligosaccharide (Beksul fructooligosaccharide (containing 55 wt % or more of fructooligosaccharide in terms of solid content)) was used in an amount of 100 wt %.

Comparative Example 4: Starch Syrup

Commercially available starch syrup (Malt Ion starch syrup 82 (containing 45% or more of maltose), CJ CheilJedang) was used in an amount of 100 wt %.

Experimental Example 1: Determination of Viscosity and Properties of Allulose-Containing Syrup Composition The viscosity of each of the syrup compositions prepared in Examples 1 to 25 and Comparative Examples 1 to 4 was measured under conditions of spindle No. 5, 20 rpm, and 25° C. using a viscometer (Brookfield DV-II +Pro Viscometer, Brookfield Engineering Laboratories, Inc.), and properties of each of the syrup compositions were determined with the naked eye.

As can be seen in Table 1 and FIG. 1, it was confirmed that the viscosity and properties of the syrup compositions of Examples 1 to 20 were significantly improved, as compared with those of the syrup composition of Comparative Example 1. Specifically, the syrup compositions prepared by mixing 0.1 parts by weight to 0.5 parts by weight of cellulose gum or pectin relative to 100 parts by weight of allulose in terms of solid content (Examples 2 to 4 and Examples 17 to 19), the syrup compositions prepared by mixing 0.2 parts by weight to 0.5 parts by weight of carrageenan gum (Examples 8 to 9), and the syrup compositions prepared by mixing 0.05 parts by weight to 0.2 parts by weight of xanthan gum (Examples 11 to 13) had a high viscosity comparable to typical commercially available liquid sugars (Comparative Examples 2 to 4, viscosity: 660 cP to 6,800 cP), had moderate gloss and stickiness and were thus improved in terms of watery properties, which have been pointed out as disadvantages of typical liquid allulose, and exhibited properties equivalent to commercially available liquid sugars. However, it was confirmed that the allulose-containing syrup compositions of Examples 21 to 25, to which dextrin was added, exhibited insignificant improvement in viscosity with increasing addition amount while having low stickiness.

TABLE 1

|  |  | Parts by weight | Allulose | Viscosity (cP) | Properties |
| --- | --- | --- | --- | --- | --- |
| Comparative Example 1 | Allulose | 100 | — | 200 | Very low stickiness, moderate gloss |
| Comparative Example 2 | Invert sugar syrup | 100 | — | 660 | Moderate stickiness, moderate gloss |
| Comparative Example 3 | Oligosaccharide | 100 | — | 4500 | Moderate stickiness, moderate gloss |
| Comparative Example 4 | Starch syrup | 100 | — | 6800 | Moderate stickiness, moderate gloss |
| Example 1 | Cellulose gum | 0.05 | 100 | 520 | Low stickiness, moderate gloss |
| Example 2 |  | 0.1 | 100 | 880 | Moderate stickiness, moderate gloss |
| Example 3 |  | 0.2 | 100 | 1280 | Moderate stickiness, moderate gloss |
| Example 4 |  | 0.5 | 100 | 3300 | Moderate stickiness, moderate gloss |
| Example 5 |  | 1 | 100 | 10340 | Very high stickiness, low gloss |
| Example 6 | Carrageenan gum | 0.05 | 100 | 300 | Very low stickiness, moderate gloss |
| Example 7 |  | 0.1 | 100 | 360 | Very low stickiness, moderate gloss |
| Example 8 |  | 0.2 | 100 | 740 | Moderate stickiness, moderate gloss |
| Example 9 |  | 0.5 | 100 | 3360 | Moderate stickiness, moderate gloss |
| Example 10 |  | 1 | 100 | 9960 | Very high stickiness, low gloss |
| Example 11 | Xanthan gum | 0.05 | 100 | 840 | Moderate stickiness, moderate gloss |
| Example 12 |  | 0.1 | 100 | 1280 | Moderate stickiness, moderate gloss |
| Example 13 |  | 0.2 | 100 | 3280 | Moderate stickiness, moderate gloss |
| Example 14 |  | 0.5 | 100 | 9700 | Very high stickiness, low gloss |
| Example 15 |  | 1 | 100 | 17320 | Very high stickiness, low gloss |
| Example 16 | Pectin | 0.05 | 100 | 440 | Low stickiness, moderate gloss |
| Example 17 |  | 0.1 | 100 | 720 | Moderate stickiness, moderate gloss |
| Example 18 |  | 0.2 | 100 | 1680 | Moderate stickiness, moderate gloss |
| Example 19 |  | 0.5 | 100 | 6460 | Moderate stickiness, moderate gloss |
| Example 20 |  | 1 | 100 | 29400 | Very high stickiness, low gloss |
| Example 21 | Dextrin | 0.05 | 100 | 280 | Very low stickiness, moderate gloss |
| Example 22 |  | 0.1 | 100 | 280 | Very low stickiness, moderate gloss |
| Example 23 |  | 0.2 | 100 | 300 | Very low stickiness, moderate gloss |
| Example 24 |  | 0.5 | 100 | 340 | Very low stickiness, moderate gloss |
| Example 25 |  | 1 | 100 | 360 | Very low stickiness, moderate gloss |

Experimental Example 2: Determination of Crystallization

In order to determine crystallization of the allulose-containing syrup compositions and a degree of crystallization, each of the syrup compositions of Examples 1 to 20 and Comparative Examples 1 to 4 was sampled in an amount of 100 ml, and 0.5 wt % of a seed crystal was added to each sample to accelerate crystallization. For the syrup compositions of Examples 1 to 20 and Comparative Example 1 containing allulose, crystalline allulose (purity: 99%, CJ Cheiljedang) was used as the seed crystal, and for the syrup compositions of Comparative Examples 2 to 4 containing invert sugar syrup, oligosaccharide and starch syrup, respectively, crystalline glucose (99%, CJ Cheiljedang) was used as the seed crystal. While 10 samples were stored at 7° C. in accordance with the refrigeration conditions specified in the Korean Food Standards Codex in order to accelerate crystallization, crystallization of the samples was observed with the naked eye at intervals of one month (four weeks) for 8 weeks in total.

As shown in Table 2, it was confirmed that crystallization was remarkably suppressed in the syrup compositions of Examples 1 to 20, as compared with in that of Comparative Example 1. Particularly, it was confirmed that the syrup compositions to which 0.1 parts by weight or more of gum or pectin was added were equivalent to or better than those of Comparative Example 2 to 4, commercially available liquid sugars, in terms of prevention of crystallization.

TABLE 2

|  |  | Parts by weight | Allulose | Storage period 1 w | 4 w | 8 w |
|---|---|---|---|---|---|---|
| Comparative Example 1 | Allulose | 100 | — | 4/10 | 8/10 | 10/10 |
| Comparative Example 2 | Invert sugar syrup | 100 | — | 2/10 | 4/10 | 7/10 |
| Comparative Example 3 | Oligo-saccharide | 100 | — | 1/10 | 3/10 | 5/10 |
| Comparative Example 4 | Starch syrup | 100 | — | 2/10 | 5/10 | 8/10 |
| Example 1 | Cellulose gum | 0.05 | 100 | 3/10 | 7/10 | 10/10 |
| Example 2 |  | 0.1 | 100 | 2/10 | 5/10 | 6/10 |
| Example 3 |  | 0.2 | 100 | 1/10 | 3/10 | 5/10 |
| Example 4 |  | 0.5 | 100 | 0/10 | 1/10 | 4/10 |
| Example 5 |  | 1 | 100 | 0/10 | 0/10 | 2/10 |
| Example 6 | Carrageenan gum | 0.05 | 100 | 3/10 | 8/10 | 10/10 |
| Example 7 |  | 0.1 | 100 | 2/10 | 6/10 | 8/10 |
| Example 8 |  | 0.2 | 100 | 1/10 | 5/10 | 7/10 |
| Example 9 |  | 0.5 | 100 | 1/10 | 3/10 | 5/10 |
| Example 10 |  | 1 | 100 | 1/10 | 2/10 | 3/10 |
| Example 11 | Xanthan gum | 0.05 | 100 | 3/10 | 8/10 | 10/10 |
| Example 12 |  | 0.1 | 100 | 2/10 | 5/10 | 8/10 |
| Example 13 |  | 0.2 | 100 | 2/10 | 3/10 | 7/10 |
| Example 14 |  | 0.5 | 100 | 1/10 | 2/10 | 3/10 |
| Example 15 |  | 1 | 100 | 0/10 | 0/10 | 1/10 |
| Example 16 | Pectin | 0.05 | 100 | 3/10 | 7/10 | 9/10 |
| Example 17 |  | 0.1 | 100 | 1/10 | 4/10 | 6/10 |
| Example 18 |  | 0.2 | 100 | 1/10 | 3/10 | 5/10 |
| Example 19 |  | 0.5 | 100 | 0/10 | 1/10 | 3/10 |
| Example 20 |  | 1 | 100 | 0/10 | 0/10 | 1/10 |

Experimental Example 3: Sensory Evaluation

Each of the syrup compositions of Examples 1 to 20 and Comparative Examples 1 to 3 was diluted to 10 Brix using Equation 1 and used as a sample for sensory evaluation.

<Equation 1>

$$\text{Brix of original sample} \times \text{Weight of original sample} = \text{Brix of diluted sample} \times (\text{Weight of original sample} + \text{Weight of purified water}) \quad (1)$$

Brix: Amount (g) of solids (saccharides dissolved in 100 g of solution)

Sensory evaluation was performed on each sample by examining the degrees of off-taste and off-flavor, body, and preference of the sample in 15 trained panel members, followed by evaluation by a 5-point scale (5: very high, 4: high, 3: moderate, 2: low, 1: very low) and averaging the values. Results are shown in Table 3.

<Definition of Sensory Evaluation Terms>

Off-taste and off-flavor: Abnormal taste and flavor, not the original taste and flavor of the sample Body: The intensity of the overall taste that is felt throughout the mouth after the sample has been held in the mouth or swallowed Preference: Personal acceptability As shown in Table 3, it was confirmed that the allulose syrup compositions (Examples 1 to 20), to which cellulose gum, carrageenan gum, xanthan gum, or pectin was added, exhibited considerably reduced off-taste and off-flavor and significantly increased body and preference, as compared with the liquid allulose (Comparative Example 1). However, the allulose syrup compositions of Examples 1 to 20 exhibited relatively low preference, as compared with those of Comparative Examples 2 and 3, commercially available liquid sugars.

TABLE 3

|  |  |  |  | Sensory evaluation item | | |
|---|---|---|---|---|---|---|
|  |  | Parts by weight | Allulose | Off-taste and off-flavor | Body | Preference |
| Comparative Example 1 | Allulose | 100 | — | 4.0 | 2.0 | 1.5 |
| Comparative Example 2 | Invert sugar syrup | 100 | — | 2.5 | 4.0 | 3.8 |
| Comparative Example 3 | Oligosaccharide | 100 | — | 2.0 | 3.8 | 4.0 |
| Example 1 | Cellulose gum | 0.05 | 100 | 3.6 | 2.5 | 2.4 |
| Example 3 |  | 0.2 | 100 | 3 | 2.8 | 3.2 |
| Example 4 |  | 0.5 | 100 | 3.2 | 3.3 | 3 |
| Example 5 |  | 1 | 100 | 4 | 4 | 1.7 |
| Example 6 | Carrageenan gum | 0.05 | 100 | 3.9 | 2.1 | 2 |
| Example 8 |  | 0.2 | 100 | 3.2 | 2.6 | 2.8 |
| Example 9 |  | 0.5 | 100 | 3.5 | 3.3 | 2.6 |

TABLE 3-continued

|  |  | Parts by weight | Allulose | Off-taste and off-flavor | Body | Preference |
|---|---|---|---|---|---|---|
| Example 10 |  | 1 | 100 | 4.1 | 4.2 | 1.8 |
| Example 11 | Xanthan gum | 0.05 | 100 | 3.7 | 2.7 | 2.2 |
| Example 13 |  | 0.2 | 100 | 3.1 | 3.3 | 3 |
| Example 14 |  | 0.5 | 100 | 3.3 | 3.7 | 2.5 |
| Example 15 |  | 1 | 100 | 3.9 | 4 | 2 |
| Example 16 | Pectin | 0.05 | 100 | 3.7 | 2.7 | 2.4 |
| Example 18 |  | 0.2 | 100 | 2.7 | 3.1 | 3.4 |
| Example 19 |  | 0.5 | 100 | 3.1 | 3.5 | 2.9 |
| Example 20 |  | 1 | 100 | 3.6 | 4.4 | 2 |

Experimental Example 4: Determination of Additional Sensory Enhancement by Salt Addition As described above, the allulose syrup compositions to which gum or pectin was added were improved in viscosity and sensory properties, as compared with Comparative Example 1, but exhibited relatively low preference, as compared with the typical commercially available liquid sugars (Comparative Examples 2 and 3). An additional sensory enhancement experiment was conducted by adding salt to increase preference.

4-1. Preparation of Salt-Added Allulose Syrup Composition

In terms of solid content, 0.2 parts by weight of cellulose gum, carrageenan gum, xanthan gum, or pectin were mixed with 100 parts by weight of allulose, followed by homogenization, and 0.05 parts by weight, 0.5 parts by weight, 2 parts by weight, or 5 parts by weight of salt (Premium Pure Salt (sodium chloride content: 99% or more), Hanju Salt) was added, followed by homogenization, thereby preparing syrup compositions of Examples 26 to 41.

4-2. Sensory Evaluation of Salt-Added Allulose Syrup Composition

Each of the syrup compositions of Examples 26 to 41 and Comparative Examples 1 to 3 was diluted to 10 Brix using Equation 1 in Experimental Example 3 and used as a sample for sensory evaluation.

Sensory evaluation was performed on each sample by examining the degrees of off-taste and off-flavor, body, and preference of the sample in 15 trained panel members, followed by evaluation by a 5-point scale (5: very high, 4: high, 3: moderate, 2: low, 1: very low) and averaging the values. Results are shown in Table 4.

As shown in Table 4, it was confirmed that the off-taste/off-flavor, body, and preference of the allulose-containing syrup compositions to which 0.05 parts by weight to 5 parts by weight of salt was added were considerably improved, as compared with those of the allulose-containing syrup compositions without added salt (Examples 1 to 20) and reached a similar level to commercially available liquid sugars (Comparative Examples 2 and 3). Particularly, when salt was added, the allulose-containing syrup compositions including pectin exhibited better preference than the commercially available liquid sugars.

TABLE 4

|  |  |  | Salt | | Sensory evaluation item | | |
|---|---|---|---|---|---|---|---|
|  |  | Parts by weight | Parts by weight | Allulose | Off-taste and off-flavor | Body | Preference |
| Comparative Example 1 | Allulose | 100 | — | — | 4.0 | 2.0 | 1.5 |
| Comparative Example 2 | Invert sugar syrup | 100 | — | — | 2.5 | 4.0 | 3.6 |
| Comparative Example 3 | Oligosaccharide | 100 | — | — | 2.0 | 3.8 | 3.8 |
| Example 26 | Cellulose gum | 0.2 | 0.05 | 100.00 | 3 | 2.8 | 3 |
| Example 27 |  |  | 0.5 | 100.00 | 2.6 | 3.2 | 3.5 |
| Example 28 |  |  | 2 | 100.00 | 2.8 | 3.9 | 3.4 |
| Example 29 |  |  | 5 | 100.00 | 3.1 | 4.3 | 3 |
| Example 30 | Carrageenan gum | 0.2 | 0.05 | 100.00 | 2.8 | 2.9 | 3.3 |
| Example 31 |  |  | 0.5 | 100.00 | 2.3 | 3.6 | 3.7 |
| Example 32 |  |  | 2 | 100.00 | 2.6 | 4 | 3.5 |
| Example 33 |  |  | 5 | 100.00 | 3.1 | 4.3 | 3.2 |
| Example 34 | Xanthan gum | 0.2 | 0.05 | 100.00 | 3.1 | 3 | 3 |
| Example 35 |  |  | 0.5 | 100.00 | 2.8 | 3.9 | 3.4 |
| Example 36 |  |  | 2 | 100.00 | 2.9 | 4.2 | 3.1 |
| Example 37 |  |  | 5 | 100.00 | 3.1 | 4.6 | 2.7 |
| Example 38 | Pectin | 0.2 | 0.05 | 100.00 | 2.7 | 3.1 | 3.5 |
| Example 39 |  |  | 0.5 | 100.00 | 2 | 3.5 | 4 |
| Example 40 |  |  | 2 | 100.00 | 2.3 | 3.8 | 3.8 |
| Example 41 |  |  | 5 | 100.00 | 2.8 | 4.2 | 3.4 |

The invention claimed is:

1. A syrup composition comprising: gum, pectin, or a combination thereof; and allulose,
    wherein the gum, the pectin or a combination thereof is present in an amount of 0.05 parts by weight to 0.5 parts by weight relative to 100 parts by weight of the allulose in terms of solid content, wherein the allulose is present in an amount of 70 parts by weight to 99 parts by weight relative to 100 parts by weight of the syrup composition in terms of solid content.

2. The syrup composition according to claim 1, wherein the syrup composition has a viscosity of 600 cP to 7,000 cP.

3. The syrup composition according to claim 1, wherein the gum is xanthan gum, carageenan gum or cellulose gum.

4. The syrup composition according to claim 1, further comprising a salt.

5. The syrup composition according to claim 4, wherein the salt is present in an amount of 0.05 parts by weight to 5 parts by weight relative to 100 parts by weight of the allulose in terms of solid content.

6. The syrup composition according to claim 4, wherein the salt is sodium chloride.

7. The syrup composition according to claim 1 wherein crystallization of the syrup composition is suppressed.

8. A method for improving at least one property selected from the group consisting of viscosity, taste, and storage stability of the syrup composition according to claim 1, comprising applying gum, pectin, or a combination thereof to allulose.

9. A method for improving at least one property selected from the group consisting of viscosity, taste, and storage stability of the syrup composition according to claim 4, comprising applying gum, pectin, or a combination thereof to allulose.

10. A food comprising the syrup composition according to claim 1.

11. A food comprising the syrup composition according to claim 4.

* * * * *